(12) United States Patent  
Malipatil et al.

(10) Patent No.: US 9,385,858 B2
(45) Date of Patent: Jul. 5, 2016

(54) TIMING PHASE ESTIMATION FOR CLOCK AND DATA RECOVERY

(71) Applicant: LSI Corporation, San Jose, CA (US)

(72) Inventors: Amaresh V. Malipatil, San Jose, CA (US); Viswanath Annampedu, Schnecksville, PA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 143 days.

(21) Appl. No.: 13/776,905

(22) Filed: Feb. 26, 2013

(65) Prior Publication Data

US 2014/0241478 A1    Aug. 28, 2014

Related U.S. Application Data

(60) Provisional application No. 61/766,839, filed on Feb. 20, 2013.

(51) Int. Cl.
*H04L 7/04* (2006.01)
*H04L 7/00* (2006.01)

(52) U.S. Cl.
CPC ............. *H04L 7/0004* (2013.01); *H04L 7/007* (2013.01)

(58) Field of Classification Search
CPC ................. H04L 7/0083; H04L 2025/03656; H04L 25/0292; H04L 7/00; H04L 27/1566; H04L 7/033; H04L 7/0331; H04L 7/03314; H04I 27/2635; H03L 7/00
USPC .......... 375/354, 355, 362, 368, 376, 326, 327
See application file for complete search history.

(56) References Cited

U.S. PATENT DOCUMENTS

| | | | | | |
|---|---|---|---|---|---|
| 3,978,407 | A | * | 8/1976 | Forney et al. | 375/231 |
| 5,481,304 | A | * | 1/1996 | Park et al. | 348/240.2 |
| 5,568,465 | A | * | 10/1996 | Hutchins et al. | 369/59.15 |
| 5,870,591 | A | * | 2/1999 | Sawada | 713/500 |
| 5,940,136 | A | * | 8/1999 | Abe | G09G 5/008 345/212 |
| 5,990,968 | A | * | 11/1999 | Naka et al. | 348/537 |
| 6,081,565 | A | * | 6/2000 | Marandi et al. | 375/345 |
| 6,115,075 | A | * | 9/2000 | Yoneno | 348/537 |
| 6,266,799 | B1 | * | 7/2001 | Lee et al. | 716/113 |
| 6,291,962 | B1 | * | 9/2001 | Ogura et al. | 318/609 |
| 6,304,296 | B1 | * | 10/2001 | Yoneno | 348/537 |
| 6,323,910 | B1 | * | 11/2001 | Clark, III | 348/537 |
| 6,377,416 | B1 | * | 4/2002 | Kikuta | 360/77.02 |

(Continued)

OTHER PUBLICATIONS

J.D.H. Alexander, "Clock Recovery from Random Binary Data," Electronics Letters, vol. 11, No. 22, Oct. 30, 1975, pp. 541-542.

(Continued)

*Primary Examiner* — Emmanuel Bayard

(57) ABSTRACT

In order to initialize the phase of the recovered clock signal used in clock-and-data recovery (CDR) circuitry, the normal, on-line CDR processing is disabled. The sum of the absolute values of analog-to-digital converter (ADC) samples are generated for different clock phases over each unit interval (UI) of the analog signal sampled by the ADC for a specified period of time. The phase corresponding to the maximum sum is selected as the initial phase for the recovered clock signal for enabled, on-line CDR processing, which among other things, automatically updates the clock phase to ensure that the ADC samples the analog signal near the center of each UI.

20 Claims, 3 Drawing Sheets

(56) References Cited

U.S. PATENT DOCUMENTS

| | | | |
|---|---|---|---|
| 6,404,422 B1* | 6/2002 | Choi | 345/211 |
| 6,456,677 B1* | 9/2002 | Hiramatsu et al. | 375/354 |
| 6,462,726 B1* | 10/2002 | Hamada | G09G 5/008 345/98 |
| 6,501,452 B1* | 12/2002 | Weng et al. | 345/89 |
| 6,556,637 B1* | 4/2003 | Moriuchi | G11B 20/10009 375/233 |
| 6,671,112 B2* | 12/2003 | Murakami et al. | 360/39 |
| 6,686,969 B1* | 2/2004 | Hara et al. | 348/537 |
| 6,900,676 B1* | 5/2005 | Tamura | 327/156 |
| 6,924,796 B1* | 8/2005 | Someya et al. | 345/213 |
| 7,085,333 B2* | 8/2006 | Jeffers et al. | 375/345 |
| 7,339,872 B2* | 3/2008 | Ogura | 369/59.22 |
| 7,388,908 B2* | 6/2008 | Dowling | H04L 25/03057 375/229 |
| 7,573,348 B2* | 8/2009 | Bauernfeind et al. | 332/126 |
| 7,746,969 B2* | 6/2010 | Bryan | H04L 25/03878 375/219 |
| 7,813,065 B2* | 10/2010 | Annampedu et al. | 360/29 |
| 7,889,825 B2* | 2/2011 | Tsai | 375/355 |
| 8,073,091 B2* | 12/2011 | Yamashita | 375/362 |
| 8,139,630 B2* | 3/2012 | Agazzi | H03M 1/0626 375/232 |
| 8,174,949 B2* | 5/2012 | Ratnakar Aravind | 369/59.19 |
| 8,237,597 B2* | 8/2012 | Liu et al. | 341/155 |
| 8,299,948 B2* | 10/2012 | Shibasaki et al. | 341/155 |
| 8,310,595 B2* | 11/2012 | Buttimer et al. | 348/572 |
| 8,363,683 B2* | 1/2013 | Agazzi et al. | 370/516 |
| 8,411,383 B2* | 4/2013 | Cao et al. | 360/25 |
| 8,411,385 B2* | 4/2013 | Annampedu | 360/51 |
| 8,525,771 B2* | 9/2013 | Kawana et al. | 345/99 |
| 8,526,131 B2* | 9/2013 | Annampedu et al. | 360/39 |
| 8,615,062 B2* | 12/2013 | Chmelar | 375/350 |
| 8,664,983 B1* | 3/2014 | Soh | 327/141 |
| 8,669,891 B2* | 3/2014 | Xia et al. | 341/139 |
| 8,670,512 B1* | 3/2014 | Wang | 375/371 |
| 8,953,950 B2* | 2/2015 | Nazarathy et al. | 398/203 |
| 2002/0021519 A1* | 2/2002 | Rae | 360/51 |
| 2002/0080898 A1* | 6/2002 | Agazzi et al. | 375/355 |
| 2002/0172304 A1* | 11/2002 | Saze et al. | 375/340 |
| 2003/0079161 A1* | 4/2003 | Verboom | 714/42 |
| 2004/0090413 A1* | 5/2004 | Yoo | 345/100 |
| 2004/0202266 A1* | 10/2004 | Gregorius et al. | 375/355 |
| 2005/0068650 A1* | 3/2005 | Annampedu et al. | 360/39 |
| 2005/0135470 A1* | 6/2005 | Momtaz | 375/233 |
| 2006/0155816 A1* | 7/2006 | Umei et al. | 709/208 |
| 2006/0197692 A1* | 9/2006 | Gong et al. | 341/155 |
| 2006/0256849 A1* | 11/2006 | Tseng et al. | 375/232 |
| 2007/0002990 A1* | 1/2007 | Lee et al. | 375/355 |
| 2007/0047683 A1* | 3/2007 | Okamura et al. | 375/355 |
| 2007/0110199 A1* | 5/2007 | Momtaz et al. | 375/350 |
| 2007/0146014 A1* | 6/2007 | Cheung | 327/20 |
| 2007/0230640 A1* | 10/2007 | Bryan et al. | 375/349 |
| 2007/0237276 A1* | 10/2007 | Tsai | 375/371 |
| 2008/0001797 A1* | 1/2008 | Aziz et al. | 341/118 |
| 2008/0048897 A1* | 2/2008 | Parthasarthy et al. | 341/122 |
| 2008/0225990 A1* | 9/2008 | Beukema et al. | 375/326 |
| 2009/0074126 A1* | 3/2009 | Song | 375/376 |
| 2009/0196389 A1* | 8/2009 | Yamashita | 375/362 |
| 2009/0207957 A1* | 8/2009 | Fukuda et al. | 375/354 |
| 2009/0220029 A1* | 9/2009 | Yamaguchi et al. | 375/326 |
| 2009/0310665 A1* | 12/2009 | Agazzi et al. | 375/229 |
| 2010/0014573 A1* | 1/2010 | Momtaz et al. | 375/231 |
| 2010/0040182 A1* | 2/2010 | Yang et al. | 375/355 |
| 2010/0061488 A1* | 3/2010 | Endres et al. | 375/326 |
| 2010/0061497 A1* | 3/2010 | Buchmann et al. | 375/371 |
| 2010/0118426 A1* | 5/2010 | Vikramaditya et al. | 360/51 |
| 2010/0127906 A1* | 5/2010 | Yamaguchi et al. | 341/131 |
| 2010/0135378 A1* | 6/2010 | Lin et al. | 375/233 |
| 2010/0149940 A1* | 6/2010 | Nakata et al. | 369/53.34 |
| 2010/0201874 A1* | 8/2010 | Kawana et al. | 348/537 |
| 2010/0310024 A1* | 12/2010 | Agazzi et al. | 375/346 |
| 2011/0019091 A1* | 1/2011 | Chiang et al. | 348/537 |
| 2011/0074483 A1* | 3/2011 | Wang et al. | 327/306 |
| 2011/0304768 A1* | 12/2011 | Chen et al. | 348/537 |
| 2012/0244824 A1* | 9/2012 | Entezari et al. | 455/114.2 |
| 2013/0049831 A1* | 2/2013 | Nedachi | 327/158 |
| 2013/0202064 A1* | 8/2013 | Chmelar | 375/340 |
| 2013/0207708 A1* | 8/2013 | Agrawal et al. | 327/237 |
| 2013/0214829 A1* | 8/2013 | Talwalkar et al. | 327/156 |
| 2013/0287154 A1* | 10/2013 | Tomita | 375/357 |
| 2014/0098843 A1* | 4/2014 | Kong et al. | 375/219 |

OTHER PUBLICATIONS

Kurt H. Mueller et al., "Timing Recovery in Digital Synchronous Data Receivers," IEEE Transactions on Communications, vol. Com-24, No. 5, May 1976, pp. 516-531.

* cited by examiner

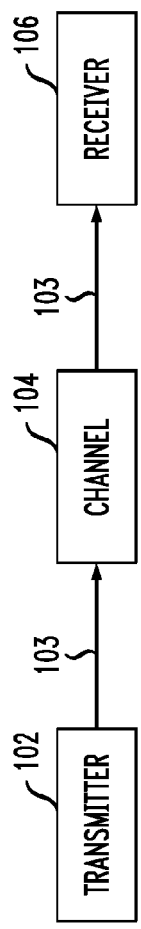
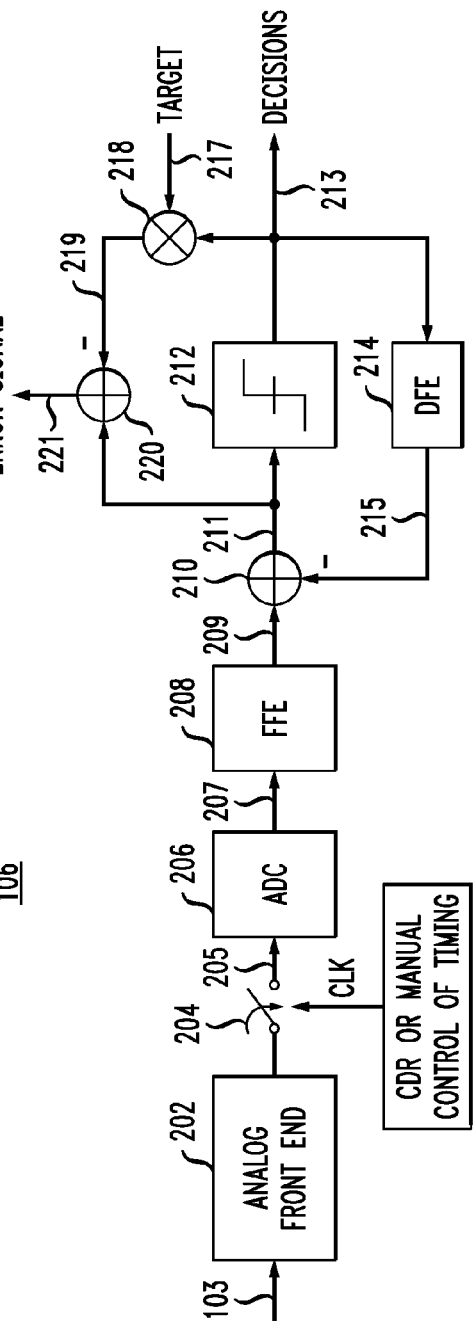

TIMING PHASE ESTIMATION FOR CLOCK AND DATA RECOVERY

CROSS-REFERENCE TO RELATED APPLICATIONS

This application claims the benefit of the filing date of U.S. provisional application No. 61/766,839, filed on Feb. 20, 2013, the teachings of which are incorporated herein by reference in their entirety.

BACKGROUND

1. Field of the Invention

The present invention relates to electronics and, more specifically but not exclusively, to clock and data recovery (CDR) circuits.

2. Description of the Related Art

This section introduces aspects that may help facilitate a better understanding of the invention. Accordingly, the statements of this section are to be read in this light and are not to be understood as admissions about what is prior art or what is not prior art.

In a digital communication system in which symbols representing modulated, encoded user data are transmitted as an analog signal from a transmitter to a receiver, the receiver may have clock-and-data recovery (CDR) circuitry that (i) derives a recovered clock signal from level transitions in the received analog signal and (ii) uses the recovered clock signal to sample the analog signal to generate a sampled binary data signal that is then demodulated and decoded to recover the original user data.

In order to accurately recover the original user data, it is important to sample the analog signal near the middle of the unit intervals (UIs) corresponding to the bits represented in the analog signal to avoid ambiguities associated with sampling the analog signal near the signal level transitions. This desired sampling is achieved by controlling the phase of the recovered clock signal relative to the analog signal.

Conventional CDR circuits have phase-adjustment circuitry that accurately controls the phase of the recovered clock signal after the phase has been initially set near the middle of the unit intervals. However, if the initial phase is not set sufficiently near the middle of the unit intervals, then the phase-adjustment circuitry might not function as desired.

BRIEF DESCRIPTION OF THE DRAWINGS

Other embodiments of the invention will become more fully apparent from the following detailed description, the appended claims, and the accompanying drawings in which like reference numerals identify similar or identical elements.

FIG. 1 shows a high-level block diagram of a communication system;

FIG. 2 shows a functional block diagram of a portion of the receiver of FIG. 1;

DETAILED DESCRIPTION

Figure 3:
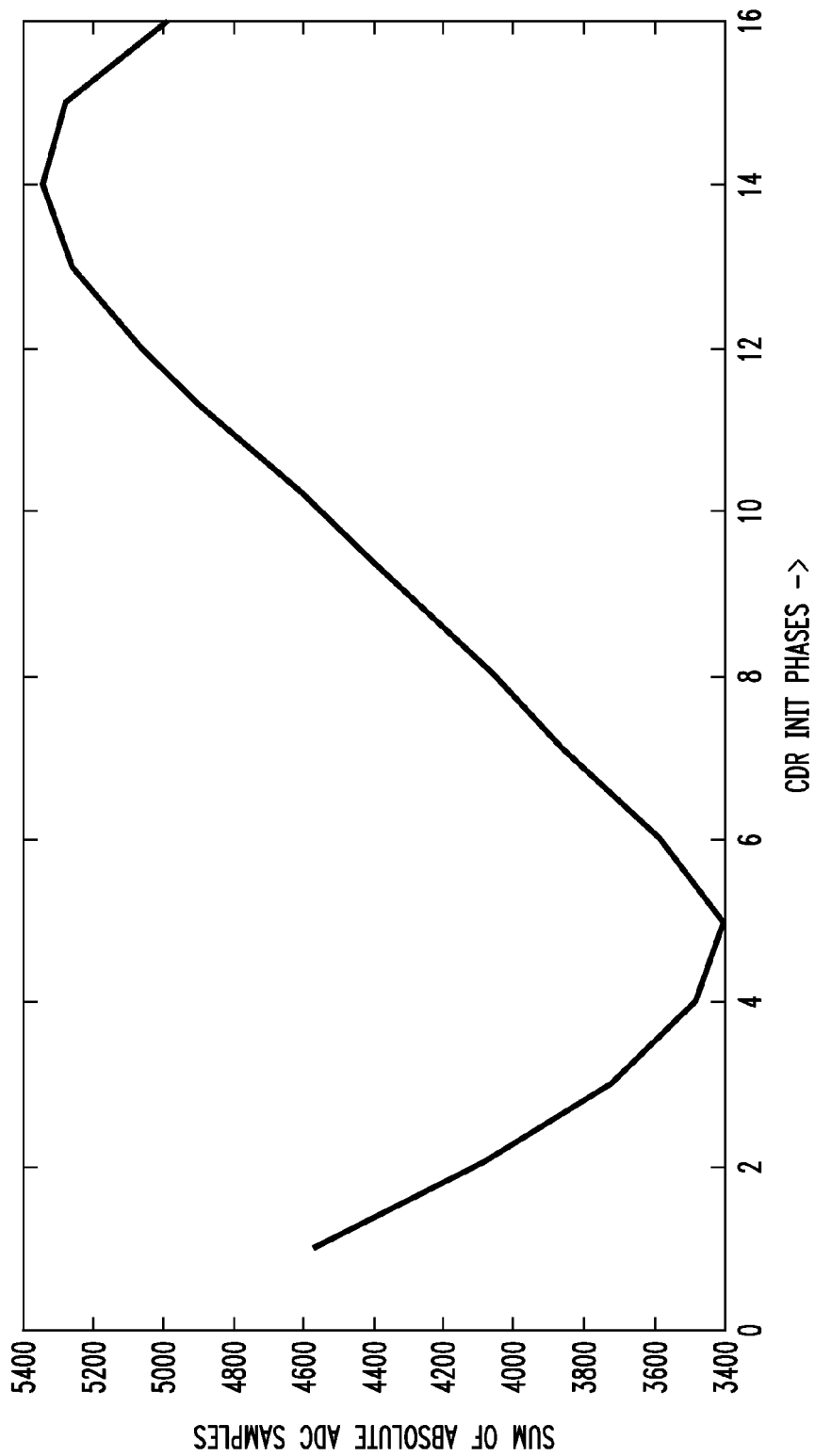
FIG. 3 shows a graphical representation of the sum of the absolute values of the multi-bit samples generated by the analog-to-digital converter (ADC) of FIG. 2.

FIG. 1 shows a high-level block diagram of a communication system 100 having a transmitter 102 that transmits an analog signal 103 via a communication channel 104 to a receiver 106. Although not shown in FIG. 1, receiver 106 has clock-and-data recovery (CDR) circuitry that (i) derives a recovered clock signal from level transitions in the received analog signal and (ii) uses the recovered clock signal to sample the analog signal to generate a binary data signal that is then demodulated and decoded to recover the original user data.

FIG. 2 shows a functional block diagram of a portion of receiver 106 of FIG. 1 that receives the transmitted analog signal 103 from communication channel 104 of FIG. 1 and, using a clock signal CLK, generates a binary data signal 213 containing a sequence of logic zero and logic one decisions for subsequent (i.e., downstream) digital demodulation and decoding processing (not shown in FIG. 2).

Receiver 106 has two modes of operation: an on-line mode and an initialization mode. As described more fully below, in the on-line mode, the CDR circuitry of receiver 106 generates and adjusts the timing (e.g., phase) of a recovered clock signal that is used as clock signal CLK, while, in the initialization mode, the clock signal CLK is not generated and adjusted using the CDR circuitry of receiver 106.

In particular, analog front end 202 applies conventional, analog signal processing such as automatic gain control and equalization to received analog signal 103. Analog-to-digital converter (ADC) 206 samples the resulting processed analog signal 205 based on the timing of clock signal CLK to generate multi-bit digital signal 207. In particular, clock signal CLK controls the opening and closing of switch 204. In one implementation, switch 204 closes at every rising edge of clock signal CLK and opens again at every falling edge of clock signal CLK. As such, ADC 206 generates one multi-bit sample of digital signal 207 for each cycle of clock signal CLK.

Feed-forward equalizer (FFE) 208 equalizes digital signal 207 to generate multi-bit equalized digital signal 209. In order to correct for inter-symbol interference (ISI) in equalized digital signal 209, difference node 210 subtracts the equalized digital signal 215 generated by decision-feedback equalizer (DFE) 214 from equalized digital signal 209 to generate multi-bit digital signal 211. Slicer 212 slices (i.e., thresholds) digital signal 211 to generate binary data signal 213, which is provided to downstream receiver circuitry (not shown) for additional processing, such as demodulation and decoding, to recover the original user data signal.

In addition to a copy of binary data signal 213 being provided to DFE 214, another copy of binary data signal 213 is also provided to mixer (e.g., multiplier) 218, which multiplies binary data signal 213 by an appropriate target signal 217. The resulting mixed signal 219 is subtracted from a copy of multi-bit digital signal 211 at difference node 220 to generate error signal 221. Among other possible uses and although not shown in FIG. 2, in the on-line mode of operation, error signal 221 is used by the CDR circuitry in receiver 106 to adjust the phase of the recovered clock signal to ensure that ADC 206 continues to sample analog signal 205 near the center of the unit intervals.

In the initialization mode of operation, the receiver's CDR circuitry is disabled, such that clock signal CLK is not automatically adjusted. Instead, the phase of clock signal CLK remains constant until explicitly controlled to change.

According to one implementation, when receiver 106 is powered up (or reset), the receiver will begin operations in its initialization mode. One purpose of the initialization mode is to determine an initial phase to use for the clock signal CLK when the mode of operation transitions from the initialization node to the on-line mode.

When receiver 106 is powered up, the clock signal CLK used to control the sampling of ADC 206 will typically not be in phase with the center of the unit intervals in analog signal 205. In general, the clock signal CLK can have any random phase relationship with analog signal 205.

FIG. 3 shows a graphical representation of the sum of the absolute values of the multi-bit samples generated by ADC 206 over a specified period of time (e.g., 2048 UI) for each of 16 different phase relationships between the clock signal CLK and analog signal 205, where the 16 different phase relationships span a single UI of analog signal 205. As indicated in FIG. 3, the resulting curve looks like sine wave, where the peak (e.g., at phase no. 14 in FIG. 3) corresponds to the center of the unit interval.

Figure 4:
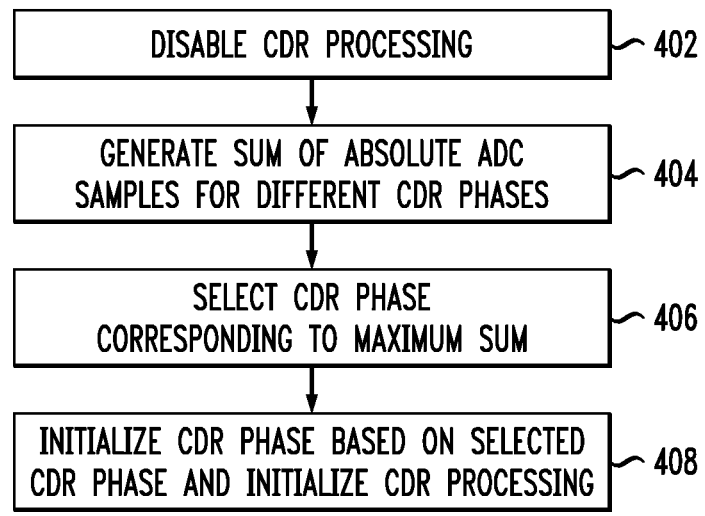
FIG. 4 shows a block diagram of a process for initializing the clock-and-data recovery (CDR) operations of the receiver of FIG. 1.

FIG. 4 shows a block diagram of a process for initializing the CDR operations of receiver 106 of FIG. 1. At step 402, receiver 106 is in its initialization mode of operation, and the receiver's CDR processing is disabled. As a result, the timing of clock signal CLK will remain constant, unless explicitly (e.g., manually) changed. Although not represented in FIG. 2, in initialization mode, the multi-bit samples generated by ADC 206 are forwarded to another processing module in the receiver. At step 404, the sum of the absolute values of the ADC samples are determined for each of a number (e.g., 16) of different phase relationships between the clock signal CLK and analog signal 205. Different ways of generating this sum data are described below. At step 406, the clock phase corresponding to the largest sum generated in step 404 is selected as the initial phase for clock signal CLK for CDR processing. At step 408, the mode of operation is changed to the on-line mode, such that the receiver's CDR processing is initiated using the selected initial phase for clock signal CLK.

One possible technique for performing step 404 to generate the absolute ADC sample sum data, such as those represented in FIG. 3, is to set the clock signal CLK to an arbitrary first phase and generate the sum of the absolute ADC samples for a specified duration. Note that the phase of clock signal CLK is not adjusted during the specified duration of this first processing segment. The clock phase is then shifted, e.g., by one-sixteenth of a UI, and a second sum of the absolute ADC samples is generated for a different time period, but of the same specified duration. Again, the phase of clock signal CLK is not adjusted during the specified duration of this next processing segment. This process of shifting the clock phase and generating another sum value is implemented for each of the (e.g., 16) different CDR phase values to generate the sum data of step 404.

Another possible technique for performing step 404 would be to provide a number (e.g., 16) of different ADC circuits, each of which is configured to sample analog signal 205 at a different clock phase, such that the sum data for the different clock phases can all be generated in parallel.

Yet another possible technique for performing step 404 would be to drive ADC 206 using a clock signal that is a number (e.g., 16) of times faster than the recovered clock signal used during on-line CDR processing. The different sum values for the different clock phases could then be generated in parallel by summing the corresponding samples for different UIs.

Note that two or more of these different techniques could be combined into a single hybrid technique.

Figure 5:
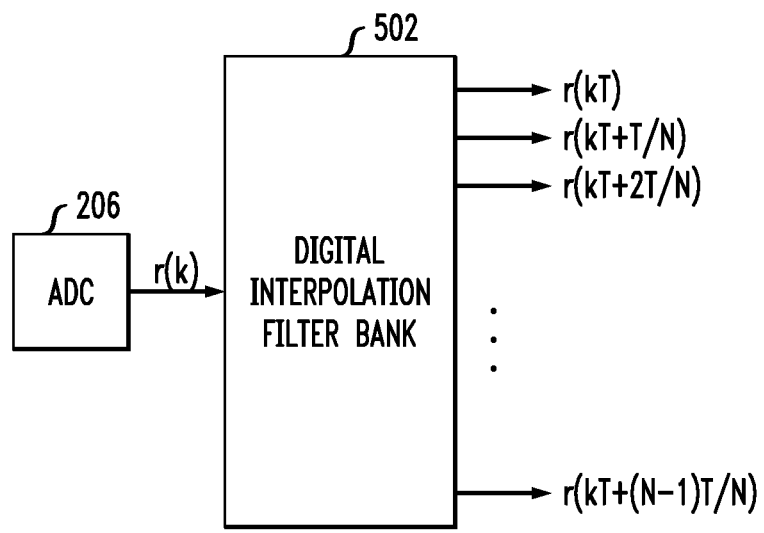
FIG. 5 represents one possible technique for the step of generating absolute ADC sample sums in FIG. 4.

FIG. 5 represents yet another possible technique for performing step 404. According to this technique, ADC 206 is sampled using a clock signal CLK having an arbitrary phase relative to analog signal 205 to generate sampled signal r(k), which is then applied to digital interpolation filter (DIF) bank 502, which is designed and configured to generate N different signals r(kT) to r(kT+(N−1)T/N) corresponding to N different clock phases uniformly spaced across each UI. These N different signals can then be summed over different UIs in parallel to generate the different sum values. The coefficients of the filters used to form DIF bank 502 can be obtained from well-known interpolation filters such as sync-interpolation filters, piecewise constant filters, linear filters, polynomial filters, spline filters, or any other suitable interpolation filters.

Each of the possible techniques described above for implementing step 404 assumes that the optimal sampling phase does not vary over the time that it takes to perform step 404. In a real-world system, however, frequency offset and/or periodic jitter could cause the optimal sampling phase to drift with time. The impact of such timing drift can be accounted for by choosing an appropriate window size over which to sum the absolute ADC samples, such that the optimal sampling phase stays sufficiently constant over that window. The selection of the window size is typically based on a trade-off between (i) the desire to pick a smaller window to reduce the adverse effects of timing drift and (ii) the desire to pick a larger window to accumulate a larger number of samples at each different sampling phase to improve the statistical validity of the results.

Independent of the exact technique used to implement step 404, the method of FIG. 4 enables receiver 106 to start its on-line CDR processing using an initial clock phase that provides the desired timing of the recovered clock signal and accurate recovery of the original user data stream.

Embodiments of the invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, general-purpose computer, or other processor.

Signals and corresponding nodes or ports may be referred to by the same name and are interchangeable for purposes here.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain embodiments of this invention may be made by those skilled in the art without departing from embodiments of the invention encompassed by the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A method for initiating clock-and-data recovery processing in a receiver that generates, based on a clock signal, a sampled multi-bit digital signal from a received analog signal, the method comprising:
   generating, by an analog-to-digital converter of the receiver, based on the clock signal, the sampled multi-bit digital signal from the received analog signal; generating, by the receiver, a plurality of sum values for a plurality of different phases of the clock signal, each sum value corresponding to a sum of absolute values of multi-bit samples in the sampled multi-bit digital signal for a different phase of the clock signal; selecting, by the receiver, an initial phase for the clock-and-data recovery processing based on magnitudes of the plurality of sum values; initiating, by the receiver, the clock-and-data recovery processing using the selected initial phase for the clock signal; equalizing the sampled multi-bit digital signal to generate a multi-bit equalized signal; and generating a multi-bit digital signal from the multi-bit equalized signal and wherein a switch configured to close at a rising edge of a clock signal and open at a falling edge of the clock signal such that the analog-to-digital converter is configured to generate, based on the clock signal, a sampled multi-bit digital signal from the received analog signal.

2. The method of claim 1, wherein the receiver includes the analog-to-digital converter configured to generate the sampled multi-bit digital signal from the received analog signal based on the clock signal.

3. The method of claim 1, wherein the receiver selects the phase corresponding to the maximum sum value as the initial phase for the clock signal for clock-and-data recovery processing.

4. The method of claim 1, wherein:
   prior to generating, by the receiver, a plurality of sum values for a plurality of different phases of the clock signal, each sum value corresponding to a sum of absolute values of multi-bit samples in the sampled multi-bit digital signal for a different phase of the clock signal, the clock-and-data recovery processing is disabled; and
   initiating, by the receiver, the clock-and-data recovery processing using the selected initial phase for the clock signal comprises the receiver enabling the clock-and-data recovery processing.

5. The method of claim 1, wherein generating, by the receiver, a plurality of sum values for a plurality of different phases of the clock signal, each sum value corresponding to a sum of absolute values of multi-bit samples in the sampled multi-bit digital signal for a different phase of the clock signal comprises, for each different phase, the receiver generating a sum value for a different time period having a common specified duration.

6. The method of claim 1, wherein generating, by an analog-to-digital converter of the receiver, based on the clock signal, the sampled multi-bit digital signal from the received analog signal comprises:
   the receiver generating the sampled multi-bit digital signal using a first phase for the clock signal; and
   wherein generating, by the receiver, a plurality of sum values for a plurality of different phases of the clock signal, each sum value corresponding to a sum of absolute values of multi-bit samples in the sampled multi-bit digital signal for a different phase of the clock signal comprises:
   the receiver applying the sampled multi-bit digital signal to a digital interpolation filter bank to generate a plurality of multi-bit digital signals; and
   the receiver generating each different sum value based on a different multi-bit digital signal.

7. The method of claim 1, wherein the receiver generates the plurality of sum values for the plurality of different phases of the clock signal with using a plurality of clock signals having the plurality of different phases.

8. The method of claim 1, wherein equalizing the sampled multi-bit digital signal to generate a multi-bit equalized signal further comprises:
   equalizing, by a feed-forward equalizer, the sampled multi-bit digital signal to generate a multi-bit equalized signal.

9. A receiver comprising:
   a switch configured to close at a rising edge of a clock signal and open at a falling edge of the clock signal such that an analog-to-digital converter is configured to generate, based on the clock signal, a sampled multi-bit digital signal from a received analog signal;
   the analog-to-digital converter configured to generate, based on the clock signal, the sampled multi-bit digital signal from the received analog signal;
   clock-and-data recovery circuitry configured to process the sampled multi-bit digital signal to automatically adjust phase of the clock signal; and
   phase-initialization circuitry configured to:
   generate a plurality of sum values for a plurality of different phases of the clock signal, each sum value corresponding to a sum of absolute values of multi-bit samples of the sampled multi-bit digital signal for a different phase of the clock signal;
   select an initial phase for the clock-and-data recovery processing based on magnitudes of the plurality of sum values; and
   initiate the clock-and-data recovery processing using the selected initial phase for the clock signal.

10. The receiver of claim 9, wherein the phase-initialization circuitry is configured to select the phase corresponding to the maximum sum value as the initial phase for the clock signal for clock-and-data recovery processing.

11. The receiver of claim 9, wherein, for each different phase, the phase-initialization circuitry is configured to generate a sum value for a different time period having a common specified duration.

12. The receiver of claim 9, further comprising a digital interpolation filter bank, wherein:
the analog-to-digital converter is configured to generate a multi-bit sampled signal using a first phase for the clock signal; and
the digital interpolation filter bank is configured to convert the sampled multi-bit digital signal into a plurality of multi-bit digital signals, each multi-bit digital signal being used by the phase-initialization circuitry to generate a different sum value.

13. The receiver of claim 9, wherein the phase-initialization circuitry is configured to generate the plurality of sum values for the plurality of different phases of the clock signal without using a plurality of clock signals having the plurality of different phases.

14. The receiver of claim 9, wherein the receiver is configured to generate a multi-bit digital signal from the multi-bit equalized signal.

15. The method of claim 1, further comprising:
slicing the multi-bit digital signal to generate binary data signals.

16. The method of claim 15, further comprising:
providing the binary data signals to downstream receiver circuitry for processing.

17. A system, comprising:
a switch configured to close at a rising edge of a clock signal and open at a falling edge of the clock signal such that an analog-to-digital converter is configured to generate, based on the clock signal, a sampled multi-bit digital signal from a received analog signal;
the analog-to-digital converter configured to generate, based on the clock signal, the sampled multi-bit digital signal from the received analog signal;
clock-and-data recovery circuitry configured to process the sampled multi-bit digital signal to automatically adjust phase of the clock signal;
phase-initialization circuitry configured to:
generate a plurality of sum values for a plurality of different phases of the clock signal, each sum value corresponding to a sum of absolute values of multi-bit samples of the sampled multi-bit digital signal for a different phase of the clock signal;
select an initial phase for the clock-and-data recovery processing based on magnitudes of the plurality of sum values; and
initiate the clock-and-data recovery processing using the selected initial phase for the clock signal; and
a feed-forward equalizer configured to equalize the sampled multi-bit digital signal to generate a multi-bit equalized signal.

18. The system of claim 17, wherein the phase-initialization circuitry is configured to select the phase corresponding to the maximum sum value as the initial phase for the clock signal for clock-and-data recovery processing.

19. The system of claim 17, wherein, for each different phase, the phase-initialization circuitry is configured to generate a sum value for a different time period having a common specified duration.

20. The system of claim 17, further comprising a digital interpolation filter bank, wherein:
the analog-to-digital converter is configured to generate a multi-bit sampled signal using a first phase for the clock signal; and
the digital interpolation filter bank is configured to convert the multi-bit equalized signal into a plurality of multi-bit digital signals, each multi-bit digital signal being used by the phase-initialization circuitry to generate a different sum value.

* * * * *